Figure 1:
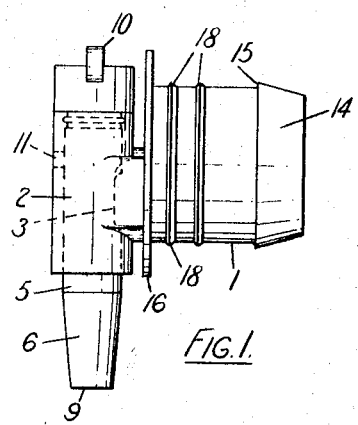

March 7, 1967   R. S. WADDINGTON ET AL   3,308,224
METHOD OF PRODUCING SPIGOT TAPS
Filed June 17, 1963

Inventors
Roger Strange Waddington
Bruce Duval
By
Stone & Mack
Attorneys.

United States Patent Office 3,308,224
Patented Mar. 7, 1967

3,308,224
METHOD OF PRODUCING SPIGOT TAPS
Rogor Strange Waddington, Putney, and Bruce Duval, Woldingham, England, assignors to Waddington & Duval (Holding) Limited, a company of England
Filed June 17, 1963, Ser. No. 288,397
5 Claims. (Cl. 264—242)

In the distribution of liquids in non-returnable containers it is fashionable to provide the containers with a closure incorporating a tap device. The arrangement is especially advantageous with large containers which tend to be too heavy when filled to permit convenient pouring of the liquid from an ordinary open neck, especially if the liquid is required in small quantities only.

For some purposes it is convenient to employ a spigot tap, that is to say a tap which comprises a sleeve part, in which is rotatably held a hollow spigot, having a side aperture which may be turned into communication with a port in the sleeve part for delivery of liquid. To be satisfactory for the use contemplated herein such a tap must be manufactured sufficiently cheaply to be expendable with the container itself. In accordance with the present invention there is provided a method of producing a spigot tap in which method the sleeve part is formed of thermoplastic material and the spigot is pushed whilst cold into the sleeve whilst the sleeve is hot, the temperature and dimension of the hot sleeve being such that the sleeve is expanded on insertion of the spigot and remains under circumferential tension when cooled. Conveniently, the spigot is also formed of thermoplastic material.

For optimum results the expanded and cooled sleeve should be from 1 to 2% less in diameter than the spigot when in the relaxed state. Thus for a spigot having a diameter of 1 cm. (which is a typical convenient size) the spigot should preferably hold the diameter of the sleeve stretched by from 0.01 to 0.02 cm. These limits are not however critical and may be varied if required. Obviously however, the tension should not be so great that the spigot is an impossibly stiff fit with the sleeve.

It is possible to manufacture a spigot tap in which the spigot holds the sleeve expanded by moulding both components in the conventional manner and inserting the spigot when the sleeve is cold. However the sleeve and the spigot must both be manufactured to expensively close tolerances in order to avoid leakage on the one hand and unwanted stiffness or difficulty of assembly on the other hand. By the present invention satisfactory taps can be produced consistently with a very low percentage of rejects by working to tolerances readily obtainable in the thermoplastic moulding art.

For best results the spigot should be formed of a material which is harder than the material forming the sleeve when the latter is in the cooled state. To this end the sleeve, for example may be formed from polyethylene and the spigot from polystyrene. Alternatively, the spigot and sleeve may both be formed from polyethylene, a harder grade thereof being selected for the spigot. In carrying out the invention a suitable relationship between the difference in dimensions of the sleeve and spigot, and the temperature of the sleeve when the spigot is inserted, is readily ascertained experimentally. We have found that for reliability in production and convenience in operation, the wall thickness of the spigot should be from 8 to 25% of the external diameter. A smaller wall thickness renders the spigot too easily deformable during assembly if the sleeve happens to be near the tight end of the convenient practical range of tolerances and tends to be unsatisfactory in holding the cooled sleeve under tension.

Spigot taps are of especial interest for use with containers of the flexible bag type which comprise a liquid tight bag formed of flexible material, usually synthetic resin sheeting, housed within a protective casing formed for example of cardboard and in a preferred form of the present method, the sleeve part of the tap is formed integrally with a hollow stopper part for closing the neck of the bag and the port in the sleeve part communicates with the interior of the stopper part.

It is to be understood that a container having a closure provided with a spigot tap produced as herein described is to be regarded as falling within the ambit of the present invention.

The following description of a preferred form of the tap, given with reference to the accompanying drawing is given by way of illustration.

Figure 2:
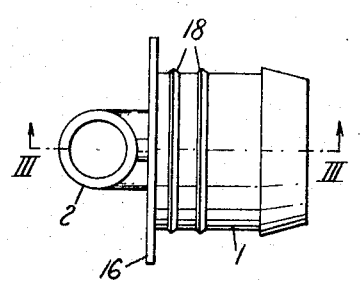
Figure 3:
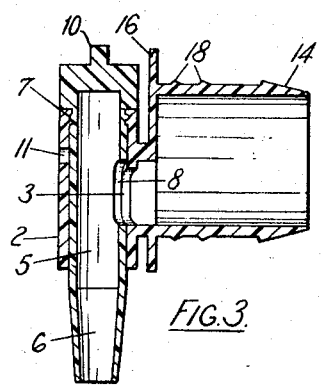
Figure 4:
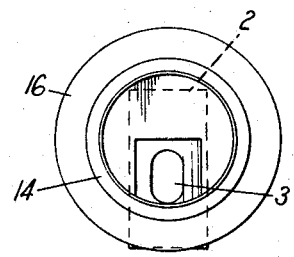
Figure 5:
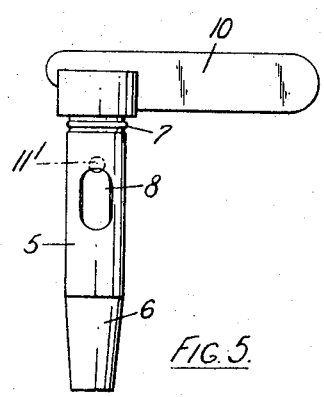
Figure 6:
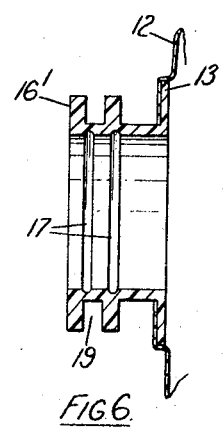

In the drawing:
FIGURE 1 shows the tap in side elevation,
FIGURE 2 shows the body part alone in plan,
FIGURE 3 is a cross section of the tap taken along a plane corresponding with III—III of FIGURE 2,
FIGURE 4 is an end elevation of the body part as seen from the right of FIGURE 3,
FIGURE 5 is an elevation of the spigot, and
FIGURE 6 shows, in cross section, part of a bag with which the tap may be used.

The tap consists of a body part having a skirted hollow stopper part 1, injection moulded from polyethylene, and having an integral sleeve part 2. An oval port 3 provides communication between the sleeve and stopper parts. A hollow spigot, injection moulded from polystyrene and shown in detail in FIGURE 5, has a cylindrical section 5, 1 cm. in external diameter and with a wall thickness of 0.1 cm., rotatably held by the sleeve part. Below the cylindrical part, the spigot has a tapered part 6 which facilitates its insertion during manufacture. Near its upper, closed end the spigot is formed with a circumferential ridge 7 which snaps into a complementary groove in the sleeve so that the spigot is located securely in the axial direction.

When the spigot is rotated so that the oval side aperture 8 thereof registers with the port 3, liquid may pass from within the stopper and through the delivery opening constituted by the open lower end 9 of the spigot. On rotation of the spigot through 180° by handle 10, flow of liquid is stopped and no leakage can occur because of the circumferential tension in the sleeve part. A small region of the upper end of aperture 8 registers with the lower part of a small hole 11 in the sleeve portion, allowing air to enter the spigot thereby ensuring rapid drainage of residual liquid. The positioning of the hole 11 relative to the aperture 8 (11' in FIGURE 5 indicates the relative positions of the hole 11 and the aperture 8) ensures that no leakage of liquid takes place therethrough.

In the manufacture of the tap, the body part is formed by injection moulding the polyethylene in a mould provided with cores for the stopper and sleeve parts. Whilst the body part is still hot from the moulding operation the spigot is taken from a supply of previously moulded spigots and forced in the cold state into the sleeve part, the diameter of the cylindrical section 5 being such that the sleeve part is stretched circumferentially thereby. The dimensions and temperature conditions are such that if the spigot is removed after the sleeve has cooled, the sleeve has an un-tensioned diameter less by from 0.010 to 0.020 cm. than the diameter of the sleeve portion, i.e. the spigot holds the sleeve to an internal diameter from 1 to 2% greater than its circumferential tension-free diameter.

Rotation of the spigot in the sleeve requires firm but comfortable finger pressure on the handle 10 when the spigot is lubricated with the liquid. Even the movement of the dry spigot for a first withdrawal of liquid is comfortably achieved, there being no tendency to jam. The firmness is sufficient to prevent accidental opening during transit or use and these properties have not, so far as we are aware been previously achieved in any tap of such simple design. If the oversize spigot were forced into position after the sleeve had cooled, it would have an impossibly tight fit therein.

The bag shown in part in FIGURE 6 consists of a flexible polythene wall part 12 around the access aperture of which is welded the flange 13 of a moulded polythene neck so dimensioned that tapered portion 14 of the tap can enter the bag and spring outwardly until circumferential land 15 abuts around the periphery of the access aperture with the flange 16 engaging the surface 16' of the neck. The neck is formed with internal grooves 17 having a snap fit with ridges 18 on the tap.

The exterior of the neck is shaped to provide a circumferential groove 19 by which it may be held relative to a cardboard or other protective casing, and in a preferred arrangement the flange is engaged with a slot in the casing so that it may be moved downwardly to facilitate complete emptying of the bag.

By this invention a tap which is secure in transit and in use but nevertheless convenient in operation is provided simply and economically in the form of a pair of mouldings, neither of which requires surface finishing of any kind.

We claim:
1. A method of producing spigot taps which comprises moulding sleeve parts from a thermoplastic material, providing for the sleeve parts moulded tubular spigot parts having their external diameters greater than the internal diameters of the sleeve parts and a wall thickness of from 8 to 25% of said external diameters, forcing the spigot parts cold into the sleeve parts which have been heated, and allowing the sleeve parts to cool and be held by the spigots in circumferential tension, the difference between the external diameters of the spigot parts and the internal diameters of the sleeve parts being sufficient to ensure that the circumferential tension is adequate to yield a fluid tight mating of the sleeve and spigot parts but insufficient to produce such circumferential tension that the spigot parts are jammed against rotation within the sleeve parts.

2. A method according to claim 1 in which the spigot parts are formed of a thermoplastic material which is harder than the thermoplastic material of the sleeve parts.

3. A method according to claim 1 in which the spigot parts are formed of polystyrene and the sleeve parts are formed of polyethylene, said polystyrene being harder than said polyethylene.

4. A method of producing spigot taps which comprises forming sleeve parts in a hot-moulding operation from a first thermoplastic material, taking moulded cold tubular spigots having their external diameters greater than the internal diameters of the sleeve parts and a wall thickness of from 8 to 25% of said external diameters formed from a second thermoplastic material which is harder in the cold than is said first thermoplastic material, and, whilst said sleeve parts are still hot from said hot-moulding operation, forcing the cold spigots into said sleeve parts thereby expanding the sleeve parts to fit the exteriors of the spigots and allowing the sleeve parts to cool on the spigots thereby developing circumferential tension and being held in said circumferential tension by the spigots, the difference between the external diameters of the spigot parts and the internal diameters of the sleeve parts being sufficient to ensure that the circumferential tension is adequate to yield a fluid tight mating of the sleeve and spigot parts but insufficient to produce such circumferential tension that the spigot parts are jammed against rotation within the sleeve parts.

5. A method according to claim 4 in which the sleeves are held by the spigot to an internal diameter from 1 to 2% greater than their circumferential tension-free diameter.

References Cited by the Examiner
UNITED STATES PATENTS

| | | | |
|---|---|---|---|
| 1,248,593 | 12/1917 | Arnold | 156—303.1 X |
| 1,919,455 | 7/1933 | Wilson. | |
| 2,027,962 | 1/1936 | Currie. | |
| 2,075,725 | 3/1937 | Kahn | 156—303.1 X |
| 2,551,935 | 5/1951 | Flood et al. | 264—249 X |
| 2,565,316 | 8/1951 | Lucas et al. | |
| 2,679,913 | 6/1954 | Scott | 264—249 X |
| 2,989,785 | 6/1961 | Stahl | 264—249 X |

ROBERT F. WHITE, *Primary Examiner.*

L. S. SQUIRES, G. AUVILLE, *Assistant Examiners.*